(12) United States Patent
Dohring et al.

(10) Patent No.: US 8,731,454 B2
(45) Date of Patent: *May 20, 2014

(54) E-LEARNING LESSON DELIVERY PLATFORM

(75) Inventors: Doug Dohring, Glendale, CA (US); William McCaffrey, Glendale, CA (US); David Hendry, La Crescenta, CA (US)

(73) Assignee: Age of Learning, Inc., Glendale, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 13/301,641

(22) Filed: Nov. 21, 2011

(65) Prior Publication Data

US 2013/0130217 A1    May 23, 2013

(51) Int. Cl.
*G09B 3/00* (2006.01)
*G09B 25/00* (2006.01)

(52) U.S. Cl.
USPC .......................................... 434/350; 434/365

(58) Field of Classification Search
USPC ........................................................ 434/350
See application file for complete search history.

(56) References Cited

U.S. PATENT DOCUMENTS

| | | | |
|---|---|---|---|
| 5,558,520 A | 9/1996 | Werzberger | |
| 5,800,182 A | 9/1998 | Carson et al. | |
| 5,904,485 A | 5/1999 | Siefert | |
| 6,149,441 A * | 11/2000 | Pellegrino et al. | 434/350 |
| 6,353,447 B1 | 3/2002 | Truluck et al. | |
| 6,364,666 B1 | 4/2002 | Jenkins et al. | |
| 6,408,315 B1 | 6/2002 | McManus et al. | |
| 6,456,230 B2 | 9/2002 | Schwartz et al. | |
| 6,563,514 B1 | 5/2003 | Samar | |

(Continued)

FOREIGN PATENT DOCUMENTS

| | | |
|---|---|---|
| JP | 2010-160556 | 7/2010 |
| KR | 10-2000-005844 | 9/2000 |

(Continued)

OTHER PUBLICATIONS

Aesop's Fables Audio book Mobile Application on Apple® iTunes® App Store, http://itunes.apple.com/us/app/aesops-fables-for-children/id371850401?mt=8 screen capture, Accessed Dec. 2, 2010.

(Continued)

*Primary Examiner* — Robert J Utama
*Assistant Examiner* — Sadaruz Zaman
(74) *Attorney, Agent, or Firm* — Wilson, Sonsini, Goodrich & Rosati

(57) ABSTRACT

Disclosed herein are e-learning lesson delivery platforms, products, programs, and methods comprising a digital processing device and a program that creates a lesson delivery server, wherein said server comprises: a plurality of learning activities, wherein said activities are organized according to an instructional plan designed to accomplish one or more educational objectives in at least one subject, wherein said plan identifies one or more activities for use in a guided environment and one or more activities for assignment as independent work; a module for displaying and providing access to said one or more activities in a guided environment; a module for assigning said one or more activities as independent work to one or more learners, wherein said module is only accessible by a mentor; and a module for displaying and providing access to activities assigned as independent work, wherein said module is accessible by a mentor or a learner.

20 Claims, 3 Drawing Sheets

(56) References Cited

U.S. PATENT DOCUMENTS

| | | | |
|---|---|---|---|
| 6,585,519 | B1 | 7/2003 | Jenkins et al. |
| 6,755,659 | B2 | 6/2004 | LoSasso et al. |
| 6,775,518 | B2 | 8/2004 | Norcott et al. |
| 6,827,578 | B2 | 12/2004 | Krebs et al. |
| 6,877,987 | B2 | 4/2005 | Kulack |
| 6,928,260 | B2 | 8/2005 | Betz et al. |
| 6,985,913 | B2 | 1/2006 | Murata |
| 6,988,138 | B1 | 1/2006 | Alcorn et al. |
| 7,014,467 | B2 | 3/2006 | Krebs et al. |
| 7,043,193 | B1 | 5/2006 | Vashi et al. |
| 7,085,707 | B2 | 8/2006 | Milner |
| 7,153,140 | B2 | 12/2006 | Ivanir et al. |
| 7,210,938 | B2 * | 5/2007 | Packard et ............. 434/365 |
| 7,286,793 | B1 | 10/2007 | Miele |
| 7,631,254 | B2 | 12/2009 | Layard et al. |
| 2001/0046658 | A1 | 11/2001 | Wasowicz |
| 2001/0053513 | A1 | 12/2001 | Corn et al. |
| 2002/0001791 | A1 | 1/2002 | Wasowicz et al. |
| 2002/0055089 | A1 * | 5/2002 | Scheirer ............. 434/350 |
| 2002/0076685 | A1 | 6/2002 | Ueno |
| 2002/0164563 | A1 | 11/2002 | Wasowicz et al. |
| 2003/0036045 | A1 | 2/2003 | Vivian |
| 2003/0124500 | A1 | 7/2003 | Frankenberry et al. |
| 2003/0152901 | A1 | 8/2003 | Altenhofen et al. |
| 2004/0076931 | A1 | 4/2004 | Rogan et al. |
| 2004/0126750 | A1 | 7/2004 | Theilmann et al. |
| 2005/0019741 | A1 | 1/2005 | Kim |
| 2005/0069849 | A1 | 3/2005 | McKinney et al. |
| 2005/0164154 | A1 | 7/2005 | Solomon |
| 2005/0277100 | A1 | 12/2005 | Bagley et al. |
| 2006/0105313 | A1 * | 5/2006 | Mansfield et al. ............ 434/350 |
| 2006/0204942 | A1 | 9/2006 | Kimball |
| 2007/0020604 | A1 | 1/2007 | Chulet |
| 2007/0088712 | A1 | 4/2007 | Watson et al. |
| 2007/0112703 | A1 | 5/2007 | Gu et al. |
| 2007/0122788 | A1 * | 5/2007 | Stevens ............. 434/323 |
| 2007/0166690 | A1 | 7/2007 | Johnson |
| 2007/0172809 | A1 | 7/2007 | Gupta |
| 2007/0196807 | A1 * | 8/2007 | Packard et al. ............. 434/350 |
| 2007/0238077 | A1 | 10/2007 | Strachar |
| 2007/0298383 | A1 | 12/2007 | Jenkins et al. |
| 2008/0020367 | A1 | 1/2008 | Jessop et al. |
| 2008/0057482 | A1 | 3/2008 | Snyder et al. |
| 2008/0229182 | A1 | 9/2008 | Hendricks et al. |
| 2008/0254434 | A1 * | 10/2008 | Calvert ............. 434/350 |
| 2008/0254438 | A1 | 10/2008 | Woolf et al. |
| 2009/0011397 | A1 | 1/2009 | Writer |
| 2009/0035733 | A1 * | 2/2009 | Meitar et al. ............. 434/118 |
| 2009/0047650 | A1 | 2/2009 | Leuck et al. |
| 2009/0094540 | A1 | 4/2009 | Gray et al. |
| 2009/0148824 | A1 | 6/2009 | Argott |
| 2009/0162822 | A1 | 6/2009 | Strachan et al. |
| 2009/0167685 | A1 | 7/2009 | Wrubel et al. |
| 2009/0239202 | A1 | 9/2009 | Stone |
| 2009/0291426 | A1 | 11/2009 | Polivka |
| 2009/0317778 | A1 | 12/2009 | Oberman |
| 2010/0075288 | A1 | 3/2010 | Sareday |
| 2010/0081115 | A1 | 4/2010 | Harding et al. |
| 2010/0081116 | A1 | 4/2010 | Barasch et al. |
| 2011/0020781 | A1 | 1/2011 | Yang |
| 2011/0065082 | A1 | 3/2011 | Gal et al. |
| 2011/0207107 | A1 | 8/2011 | Cancilliari et al. |
| 2012/0129144 | A1 * | 5/2012 | Singh ............. 434/322 |
| 2012/0231437 | A1 * | 9/2012 | Fakhrai ............. 434/350 |

FOREIGN PATENT DOCUMENTS

| | | |
|---|---|---|
| KR | 10-2001-0008053 | 2/2001 |
| KR | 10-2001-0106820 | 12/2001 |
| KR | 10-2002-0034378 | 5/2002 |
| KR | 10-2003-0055183 | 7/2003 |
| KR | 10-2003-0070878 | 9/2003 |
| KR | 10-2007-0113355 | 11/2007 |
| KR | 10-2008-0006063 | 1/2008 |
| KR | 10-2009-0061535 | 6/2009 |
| KR | 10-2002-0092556 | 12/2009 |

OTHER PUBLICATIONS

Berenstain Bears and the Golden Rule Mobile Application on Apple® iTunes® App Store, http://itunes.apple.com/us/app/the-berenstain-bears-golden/id392186848?mt=8 screen capture, Accessed Dec. 2, 2010.

BrainPOP Featured Movie Mobile Application on Apple® iTunes® App Store, http://itunes.apple.com/us/app/brainpop-featured-movie/id364894352?mt=8 screen capture, Accessed Nov. 30, 2010.

BrainPOP Mobile Application website, http://www.brainpop.com/apps/about/ screen capture, Accessed Nov. 30, 2010.

BrainPOP website, http://www.brainpop.com/ screen capture, Accessed Oct. 13, 2010.

Children's Progress website, http://childrensprogress.com screen capture, Accessed Oct. 13, 2010.

Clever Island website, http:// www.cleverisland.com/ screen capture, Accessed Oct. 13, 2010.

Disney Preschool website, http://preschooltime.go.com/ screen capture, Accessed Oct. 13, 2010.

Dr. Seuss's ABC Mobile Application on Apple® iTunes® App Store, http://itunes.apple.com/us/app/dr.-seusss-abc/id354855128?mt=8 screen capture, Accessed Dec. 2, 2010.

Dreambox Learning website, http://www.dreambox.com/ screen capture, Accessed Oct. 13, 2010.

E-learning for Kids website, http://www.e-learningforkids.org/ screen capture, Accessed Oct. 13, 2010.

Fish Smarty website, http://www.fishsmarty.com/ screen capture, Accessed Oct. 13, 2010.

Fun Brain website, http://www.funbrain,com/ screen capture, Accessed Oct. 13, 2010.

Fun School website, http://funschool.kaboose.com/ screen capture, Accessed Oct. 13, 2010.

Gamequarinm website, http://www.gamequarium.com/ screen capture, Accessed Oct. 13, 2010.

I Know That website, http://www.iknowthat.com/FT/index_html screen capture, Accessed Oct. 13, 2010.

IXL website, http://www.ixl.com/ screen capture, Accessed Oct. 13, 2010.

Jack and the Beanstalk Kid's Story Book Mobile Application on Apple® iTunes® App Store, http://itunes.apple.com/us/app/jack-and-the-beanstalk-kids/id387612649?mt=8 screen capture, Accessed Dec. 2, 2010.

Jumpstart website, http://www.jumpstart.com/ screen capture, Accessed Oct. 13, 2010.

K5 Stars website, http://www.k5stars,com/ screen capture, Accessed Oct. 13, 2010.

Learning Planet website, http://www.learningplanet.com/ screen capture, Accessed Oct. 13, 2010.

Little Red Riding Hood Mobile Application on Apple® iTunes® App Store, http://itunes.apple.com/us/app/little-red-riding-hood-kids/id329098511?mt=8# screen capture, Accessed Dec. 2, 2010.

Miss Spider's Tea Party Mobile Application on Apple® iTunes® App Store, http://itunes.apple.com/us/app/miss-spiders-tea-party-for/id365173247?mt=8 screen capture, Accessed Dec. 2, 2010.

Mrs. P's Reader Challenge Mobile Application on Apple® iTunes® App Store, http://itunes.apple.com/us/app/mrs-p/id398450178?mt=8 screen capture, Accessed Dec. 2, 2010.

Nick Jr. Boost website, http://www.nickjrboost.com/ screen capture, Accessed Oct. 13, 2010.

One Rainy Day Mobile Application on Apple® iTunes® App Store, http://itunes.apple.com/us/app/one-rainy-day-a-read-along/id396522639?mt=8 screen capture, Accessed Dec. 2, 2010.

PBS Kids website, http://pbskids.org/ screen capture, Accessed Oct. 13, 2010.

Quiz Tree website, http://www quiz-tree.com/ screen capture, Accessed Oct. 13, 2010.

Sesame St. website, http:// www.sesame.street.org/ screen capture, Accessed Oct. 13, 2010.

(56) References Cited

OTHER PUBLICATIONS

Sophia Wants to Be . . . A Painter Mobile Application on Apple® iTunes® App Store, http://itunes.apple.com/us/app/sophia-wants-to-be-. . . -a-painter/id325197608?mt=8 screen capture, Accessed Dec. 2, 2010.
Starfall ABCs Mobile Application on Apple® iTunes® App Store, http://itunes.apple.com/us/app/starfall-abcs/id395623983?mt=8 screen capture, Accessed Nov. 30, 2010.
Starfall Education Mobile Application website, http://more.starfall.com/info/apps/starfall-education.php screen capture, Accessed Nov. 30, 2010.
Starfall website, http://more.starfall.coml screen capture, Accessed Oct. 13, 2010.
The Emperor's New Clothes Mobile Application on Apple® iTunes® App Store, http://itunes.apple.com/us/app/id389589624?mt=8 screen capture, Accessed Dec. 2, 2010.
The Velveteen Rabbit, http://itunes.apple.com/us/app/the-velveteen-rabbit/id395279598?mt=8 screen capture, Accessed Dec. 2, 2010.
Time 4 Learning website, http://www.time4learning.com/ screen capture, Accessed Oct. 13, 2010.
Toy Story Read Along Mobile Application on Apple® iTunes® App Store, http://itunes.apple.com/us/app/toy-story-read-along/id364376920?mt=8 screen capture, Accessed Dec. 2, 2010.
Up to Ten website, http://uptoten.com/ screen capture, Accessed Oct. 13, 2010.
Webkinz website, http:// www.webkinz.com/ screen capture, Accessed Oct. 13, 2010.
Zoo You Later—Monkey Business Mobile Application on Apple® iTunes® App Store, http://itunes.apple.com/us/app/zoo-you-later-monkey-business/id373017053?mt=8 screen capture, Accessed Dec. 2, 2010.
Zoodles website, http://w\vw zoodles.com/home/marketing screen capture, Accessed Oct. 13, 2010.
PCT/US2011/060848 International Search Report dated Jun. 14, 2012.
PCT/US2011/060850 International Search Report dated May 14, 2012.
PCT/US2011/060853 International Search Report dated May 17, 2012.
PCT/US2011/063602 International Search Report mailed Jun. 21, 2012.
U.S. Appl. No. 12/946,538 Non-Final Office Action issued Oct. 15, 2012.
U.S. Appl. No. 12/946,570 Non-Final Office Action dated Oct. 24, 2012.
U.S. Appl. No. 12/963,546 Non-Final Office Action dated Aug. 31, 2012.
U.S. Appl. No. 12/946,627 Final Office Action dated Oct. 21, 2013.
PCT/US2011/060848 International Report on Patentability dated May 30, 2013.
PCT/US2011/060850 International Report on Patentability dated May 30, 2013.
PCT/US2011/060853 International Report on Patentability dated May 30, 2013.
PCT/US2012/065940 International Search Report dated May 24, 2013.
U.S. Appl. No. 12/946,538 Final Office Action issued May 8, 2013.
U.S. Appl. No. 12/946,570 Final Office Action dated Apr. 11, 2013.
U.S. Appl. No. 12/946,570 Final Office Action dated Jul. 31, 2013.
U.S. Appl. No. 12/946,627 Non-Final Office Action dated Apr. 10, 2013.
U.S. Appl. No. 12/963,546 Final Office Action dated Mar. 28, 2013.
U.S. Appl. No. 12/946,570 Non-Final Office Action dated Mar. 11, 2014.

* cited by examiner

E-LEARNING LESSON DELIVERY PLATFORM

BACKGROUND OF THE INVENTION

Higher levels of education offer benefits, both intangible and economic, for students and the societies in which they live. Personal benefits can include a feeling of fulfillment, social and economic mobility, and increased quality of life. According to the U.S. Census Bureau, over an adult's working life, high school graduates earn an average of $1.2 million; associate's degree holders earn about $1.6 million; and bachelor's degree holders earn about $2.1 million. On a larger scale, countries with high enrollment and graduation rates have experienced faster economic growth than countries without.

Effective educational experiences are important at all stages of life. Preschool education develops the foundation for children's enduring language, motor, and analytical skills. Primary education helps children achieve basic literacy and numeracy, and establishes foundations in science, mathematics, geography, history, and other social sciences. Secondary education provides adolescents opportunities to learn in areas beyond traditional basic subjects including foreign languages, advanced math, advanced science, and advanced humanities. Importantly, secondary education also prepares students for the transition to higher education as adults. Higher education provides specialized academic, professional, or vocational training, resulting in award of certificates, diplomas, or academic degrees. In professional life, education enables adults to advance within their career or re-train to support a career change. Even in post-career life, seniors enjoy the benefits of education in pursuit of hobbies and personal interests.

SUMMARY OF THE INVENTION

Instructional planning is a process critical to effective teaching. An instructional plan is a detailed stepwise strategy, developed by a mentor or an instructional designer, to accomplish one or more specific educational objectives in one or more subjects through the mutual reinforcement of individual learning activities. Instructional plans vary in scope and may address a lesson, a learning unit, or a level of study. Additionally, instructional plans are often based on a published educational standard and provide a mechanism to ensure that teaching objectives are aligned with those of a standard. Effective instructional plans contemplate achievement of educational objectives through both learning activities completed in a mentor-guided environment and learning activities to be completed as independent work by learners.

An effective e-learning lesson delivery platform, therefore, should support implementation of instructional plans in four important ways. First, an effective e-learning lesson delivery platform should provide a diverse group of learning activities organized according to an instructional plan that identifies one or more activities for use in a guided environment and one or more for assignment as independent work. Second, a lesson delivery platform should support mentors' implementation of instructional plans by displaying and providing convenient access to those learning activities, and related resources, for use in guided or group instruction environments. Third, a lesson delivery platform should allow mentors to easily assign activities to learners for completion as independent work and allow mentors to monitor learner participation and performance in assigned independent work. Fourth, a lesson delivery platform should support individual learners' educational development through individual work by displaying and providing convenient access to those learning activities assigned to them as independent work.

Increasingly, technology offers new opportunities to create powerful learning tools. For example, multimedia technology provides new ways to support effective teaching by facilitating mentors' implementation of instructional plans in guided or group environments and by facilitating mentors' interaction with learners through assignment of independent learning activities. In such multimedia-powered environments, well-drafted instructional plans could come to life by providing mentors with access to appropriate learning activities for display in guided environments and by providing learners with access to appropriate learning activities assigned to them for completion independently. Despite these potentials, current e-learning lesson delivery platforms do not achieve these ideals.

Disclosed herein, in certain embodiments, are e-learning lesson delivery platforms comprising: a digital processing device that is optionally connected to a computer network, wherein said processing device comprises an operating system configured to perform executable instructions; and a computer program, provided to said digital processing device, including executable instructions that create a lesson delivery server, wherein said server comprises: a plurality of learning activities, wherein said activities are organized according to an instructional plan designed to accomplish one or more educational objectives in at least one subject, wherein said plan identifies one or more learning activities for use in a guided environment and identifies one or more learning activities for assignment as independent work; a software module for displaying and providing access to said one or more learning activities in a guided environment, wherein said module is adapted to support a mentor's implementation of said instructional plan; a software module for assigning said one or more learning activities as independent work to one or more learners, wherein said module is only accessible by a mentor; and a software module for displaying and providing access to learning activities assigned as independent work, wherein said module is accessible by a mentor or a learner. In some embodiments, the plurality of learning activities includes one or more activities selected from: art, articles, books, brainstorms, collaborations, compositions, demonstrations, e-books, essays, examinations, games, group activities, journals, laboratory experiments, lectures, multi-player games, music, problem sets, puzzles, quizzes, reading assignments, role-plays, simulations, songs, videos, and worksheets. In some embodiments, the software module for assigning one or more learning activities as independent work allows assignment to one learner, to a plurality of learners, or to a defined group of learners. In further embodiments, the defined group of learners is a class of learners. In some embodiments, the said software module for assigning one or more learning activities as independent work allows preview of independent activities to learners. In some embodiments, the software module for assigning one or more learning activities as independent work allows assignment of any activity in said plurality of activities. In other embodiments, the said software module for assigning one or more learning activities as independent work allows assignment of only those activities so identified by said instructional plan. In some embodiments, the software module for assigning one or more learning activities as independent work allows configuration of the amount of time each activity is available to said module for displaying and providing access to independent learning activities. In some embodiments, the software module for assigning one or more learning activities as independent work allows configuration of due dates and overdue dates for each activity to be indicated by said module for displaying and providing access to independent learning activities. In some embodiments, the independent learning activities are homework. In some embodiments, the software module for displaying and providing access to independent learning activities comprises one or more of: a mobile application, a standalone application, or a web browser plug-in, add-in, add-on, toolbar, or extension. In some embodiments, the software module for displaying and providing access to independent learning activities generates an electronic communication for one or more learners, wherein said communication is selected from: email, web mail, SMS, MMS, microblog post, social network post, instant message, or voice mail. In some embodiments, the software module for displaying and providing access to independent learning activities allows sorting, organizing, or filtering activities by one or more of: assigning mentor, assignment date, due date, subject, and type of activity. In some embodiments, the system further comprises a software module for monitoring learner progress, wherein said module is only accessible by a mentor. In further embodiments, the software module for monitoring learner progress identifies learning activities assigned as independent work and allows monitoring of independent activities separately from other activities. In further embodiments, the software module for monitoring learner progress generates a printable report.

Also disclosed herein, in certain embodiments, are computer readable media encoded with a computer program including instructions executable by the operating system of a digital processing device, wherein said instructions create a lesson delivery server, wherein said server comprises: a plurality of learning activities, wherein said activities are organized according to an instructional plan designed to accomplish one or more educational objectives in at least one subject, wherein said plan identifies one or more learning activities for use in a guided environment and identifies one or more learning activities for assignment as independent work; a software module for displaying and providing access to said one or more learning activities in a guided environment, wherein said module is adapted to support a mentor's implementation of said instructional plan; a software module for assigning said one or more learning activities as independent work to one or more learners, wherein said module is only accessible by a mentor; and a software module for displaying and providing access to learning activities assigned as independent work, wherein said module is accessible by a mentor or a learner. In some embodiments, the system further comprises a software module for monitoring learner progress, wherein said module is only accessible from a mentor account.

Also disclosed herein, in certain embodiments, are computer-implemented methods for delivering e-learning lessons, comprising the step of providing executable instructions to a digital processing device comprising an operating system configured to perform executable instructions, to create a lesson delivery server, wherein said server comprises: a plurality of learning activities, wherein said activities are organized according to an instructional plan designed to accomplish one or more educational objectives in at least one subject, wherein said plan identifies one or more learning activities for use in a guided environment and identifies one or more learning activities for assignment as independent work; a software module for displaying and providing access to said one or more learning activities in a guided environment, wherein said module is adapted to support a mentor's implementation of said instructional plan; a software module for assigning said one or more learning activities as independent work to one or more learners, wherein said module is only accessible by a mentor; and a software module for displaying and providing access to learning activities assigned as independent work, wherein said module is accessible by a mentor or a learner. In some embodiments, the software modules for displaying and providing access to one or more learning activities in a guided environment and assigning one or more learning activities as independent work are part of a school-based system adapted for one or more teachers and said software module for displaying and providing access to learning activities assigned as independent work is part of a home-based system adapted for one or more students.

DETAILED DESCRIPTION OF THE INVENTION

Figure 1:
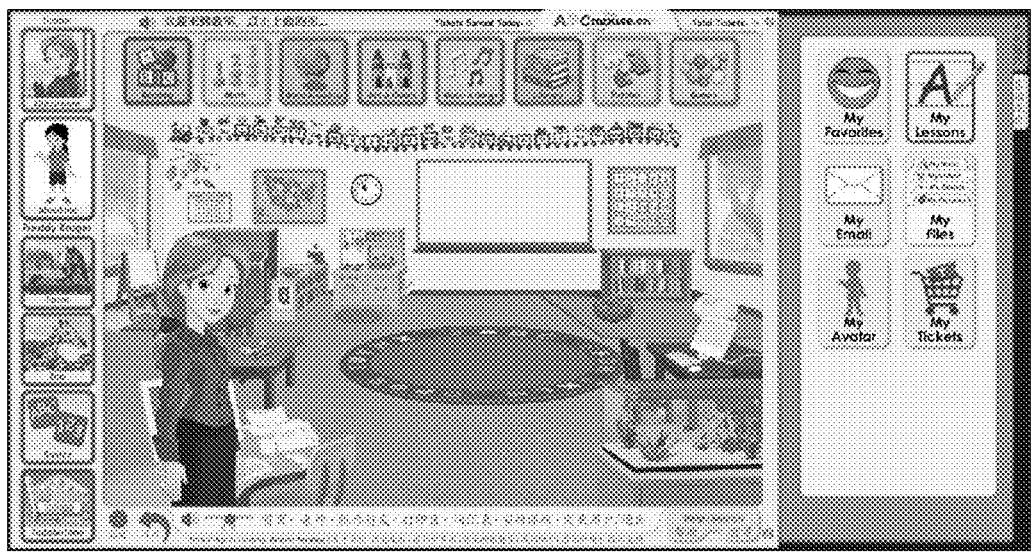
FIG. 1 shows a non-limiting example of an e-learning teaching environment; in this case, an environment representing the metaphor of a classroom and providing access to a plurality of learning activities.

Existing lesson delivery platforms fail to adequately support mentors' implementation of instructional plans because they do not effectively facilitate achievement of an instructional plan's objectives in guided or group environments, in independent work settings, or both. Thus, a primary objective of the systems, platforms, servers, programs, and methods for e-learning lesson delivery disclosed herein is to provide a rich variety of learning activities and an overarching instructional plan that identifies some learning activities for use in a guided environment and identifies some learning activities for assignment as independent work. Another objective of the systems, platforms, servers, programs, and methods disclosed herein is to support mentors' implementation of an instructional plan by providing a technical solution for displaying and providing convenient access to appropriate learning activities in guided or group instruction environments. Another objective of the systems, platforms, servers, programs, and methods disclosed herein is to further support plan implementation by providing a tool for mentors to easily assign activities to learners for completion as independent work. Still another objective is to support learners by providing convenient access to those learning activities assigned to them as independent work.

Disclosed herein, in various embodiments, are e-learning lesson delivery platforms comprising: a digital processing device that is optionally connected to a computer network, wherein said processing device comprises an operating system configured to perform executable instructions; and a computer program, provided to said digital processing device, including executable instructions that create a lesson delivery server, wherein said server comprises: a plurality of learning activities, wherein said activities are organized according to an instructional plan designed to accomplish one or more educational objectives in at least one subject, wherein said plan identifies one or more learning activities for use in a guided environment and identifies one or more learning activities for assignment as independent work; a software module for displaying and providing access to said one or more learning activities in a guided environment, wherein said module is adapted to support a mentor's implementation of said instructional plan; a software module for assigning said one or more learning activities as independent work to one or more learners, wherein said module is only accessible by a mentor; and a software module for displaying and providing access to learning activities assigned as independent work, wherein said module is accessible by a mentor or a learner.

Also disclosed herein, in various embodiments, are computer readable media encoded with a computer program including instructions executable by the operating system of a digital processing device, wherein said instructions create a lesson delivery server, wherein said server comprises: a plurality of learning activities, wherein said activities are organized according to an instructional plan designed to accomplish one or more educational objectives in at least one subject, wherein said plan identifies one or more learning activities for use in a guided environment and identifies one or more learning activities for assignment as independent work; a software module for displaying and providing access to said one or more learning activities in a guided environment, wherein said module is adapted to support a mentor's implementation of said instructional plan; a software module for assigning said one or more learning activities as independent work to one or more learners, wherein said module is only accessible by a mentor; and a software module for displaying and providing access to learning activities assigned as independent work, wherein said module is accessible by a mentor or a learner.

Also disclosed herein, in various embodiments, are computer-implemented methods for delivering e-learning lessons, comprising the step of providing executable instructions to a digital processing device comprising an operating system configured to perform executable instructions, to create a lesson delivery server, wherein said server comprises: a plurality of learning activities, wherein said activities are organized according to an instructional plan designed to accomplish one or more educational objectives in at least one subject, wherein said plan identifies one or more learning activities for use in a guided environment and identifies one or more learning activities for assignment as independent work; a software module for displaying and providing access to said one or more learning activities in a guided environment, wherein said module is adapted to support a mentor's implementation of said instructional plan; a software module for assigning said one or more learning activities as independent work to one or more learners, wherein said module is only accessible by a mentor; and a software module for displaying and providing access to learning activities assigned as independent work, wherein said module is accessible by a mentor or a learner.

VARIOUS DEFINITIONS

The term "learner," as used herein, refers to a person who interacts with an educational system for the purpose of gaining knowledge, insight, or understanding of one or more target languages or by virtue of having been allowed, asked, or assigned to interact with an educational system.

The term "mentor," as used herein, refers to a person who has an interest in, or responsibility for, facilitating or furthering the educational development of a learner and includes, by way of non-limiting examples, a parent, step-parent, adoptive parent, foster parent, grandparent, guardian, relative, friend, guide, employer, tutor, instructor, teacher, or professor, of a learner.

The term "instructional designer," as used herein, refers to any person who designs and/or evaluates learning activities, and grouped sequences of activities, that are elements of an educational system.

The term "instructional plan," as used herein, refers to a plan, conceived by an instructional designer or a mentor to a learner, designed to accomplish one or more specific educational objectives through the mutual reinforcement of individual learning activities.

The term "guided environment," as used herein, refers to an educational environment, live, recorded, remote, or online where learning activities are directed or guided by one or more mentors. Guided environments, as used herein, can include classrooms, laboratories, and e-learning environments. The learning activities performed by learners in a guided environment are referred to herein as guided work.

The term "independent work," as used herein, refers to work suggested or assigned by a mentor to be attempted or performed by one or more learners without continuous guidance by one or more mentors. Independent work, as used herein, can include homework.

The term "lesson," as used herein, refers to one or more learning activities that teach toward a specific educational objective or a specific element of a published educational standard.

The term "learning unit," as used herein, refers to one or more lessons that teach toward a general educational objective or a general element of a published educational standard.

The term "level of study," as used herein, refers to one or more learning units that teach toward a plurality of general educational objectives or an overarching element of a published educational standard.

The term "standalone application," as used herein, refers to a program that is run as an independent computer process, not an add-on to an existing process. Standalone applications are often compiled and executable.

Lesson Delivery Server

The systems, platforms, servers, programs, and methods for e-learning lesson delivery disclosed herein include a lesson delivery server. In some embodiments, the server further includes a plurality of learning activities. In further embodiments, the learning activities are organized according to an instructional plan designed to accomplish one or more educational objectives in at least one area of skill, interest, or expertise. In still further embodiments, the instructional plan identifies one or more learning activities for use in a guided environment and identifies one or more learning activities for assignment as independent work. In some embodiments, the server further includes a software module for displaying and providing access to one or more learning activities in a guided environment. In further embodiments, the software module is adapted to support a mentor's implementation of the instructional plan. In some embodiments, the server further includes a software module for assigning said one or more learning activities as independent work to one or more learners. In further embodiments, the software module is only accessible by a mentor. In some embodiments, the server further includes a software module for displaying and providing access to learning activities assigned as independent work. In further embodiments, the software module is accessible by a mentor or a learner. In some embodiments, the systems, platforms, servers, programs, and methods for e-learning lesson delivery disclosed herein further comprise a software module for monitoring the progress of one or more learners. In further embodiments, the software module for monitoring learner progress is adapted for use by a mentor and is only accessible by a mentor. In other embodiments, the software module is also accessible by one or more learners.

In some embodiments, the software modules for displaying and providing access to one or more learning activities in a guided environment and assigning one or more learning activities as independent work are part of a school-based system adapted for one or more teachers and the software module for displaying and providing access to learning activities assigned as independent work is part of a home-based system adapted for one or more students. In further embodiments, independent work is homework or work to be performed in class without continuous guidance from a teacher.

In some embodiments, the e-learning lesson delivery servers are intranet-based. In some embodiments, the e-learning lesson delivery servers are Internet-based. In further embodiments, the servers are World Wide Web-based. In still further embodiments, the servers are cloud computing-based. In other embodiments, the servers are based on data storage devices including, by way of non-limiting examples, CD-ROMs, DVDs, flash memory devices, magnetic disk drives, and optical disk drives.

Areas of Skill, Interest, or Expertise

The systems, platforms, servers, programs, and methods described herein include a plurality of learning activities organized according to an instructional plan designed to accomplish one or more educational objectives in at least one area of skill, interest, or expertise. An area of skill, interest, or expertise may include informal topics such as those relating to hobbies and personal interests. A hobby is an activity or interest usually undertaken for pleasure or relaxation. An area of skill, interest, or expertise may also include more formal subjects addressing academic or professional topics. A subject is a category of learning that a student may typically undertake in an educational institution. In some embodiments, subjects comprise topics addressing one category of learning. In other embodiments, subjects comprise interdisciplinary topics addressing more than one category of learning. An area of skill, interest, or expertise may also include topics such as those relating to professional skills. Some professional skills are not taught as formal subjects, nor are they hobbies undertaken for relaxation, rather they are topics undertaken for business purposes.

In some embodiments, one or more areas of skill, interest, or expertise are selected from hobbies and personal interests including, by way of non-limiting examples, animal husbandry, animal breeding, antiquing, artistic endeavors, automobile restoration, automobile repair, bird watching, collecting, cooking, creating dioramas, fish keeping, fishing, flower arranging, game playing, gardening, horticulture, investing, knitting, origami, outdoor recreation, performing arts, poetry, quilting, reading, sewing, scale modeling, scrapbooking, wine tasting, writing, and yoga. In some embodiments, artistic endeavors include endeavors such as drawing, glass blowing, painting, sculpting, photography, and pottery. In some embodiments, collecting includes collecting art, coins, dolls, figurines, stamps, spoons, sports cards, and toys. In some embodiments, outdoor recreation includes activities such as backpacking, bicycling, canoeing, caving, climbing, hiking, running, snow sports, and water sports. In some embodiments, performing arts include activities such as acting, dancing, singing, juggling, magic, and playing musical instruments. In some embodiments, reading includes reading materials such as books, comics, magazines, and newspapers. In some embodiments, scale modeling includes subject matter such as automobiles, planes, ships, and trains.

In some embodiments, one or more areas of skill, interest, or expertise are selected from basic subjects including, by way of non-limiting examples, reading and mathematics. In further embodiments, the subjects include one or more basic topics including, by way of non-limiting examples, letters, phonics, word families, sight words, numbers, and shapes.

In some embodiments, one or more areas of skill, interest, or expertise are selected from preschool subjects including, by way of non-limiting examples, language arts, mathematics, social studies, science, music, art, and additional languages. In further embodiments, the subjects include one or more preschool topics including, by way of non-limiting examples, citizenship, colors, computer skills, drawing, ethics, geography, music, physical education, poetry, reading, sign language, Spanish, spelling, and U.S. history.

In some embodiments, one or more areas of skill, interest, or expertise are selected from grade school subjects including, by way of non-limiting examples, language arts, mathematics, social studies, science, music and other performing arts, visual arts, additional languages, health, fitness and sports, and information technology. In further embodiments, the subjects include one or more grade school topics including, by way of non-limiting examples, biology, chemistry, citizenship, composition, computer skills, drawing, earth science, ethics, geography, grammar, physical education, poetry, pre-algebra, reading, sign language, spelling, U.S. government, U.S. history, and writing.

In some embodiments, one or more areas of skill, interest, or expertise are selected from middle school subjects including, by way of non-limiting examples, language arts, mathematics, social studies, science, music and other performing arts, visual arts, additional languages, health, fitness and sports, and information technology. In further embodiments, the subjects include one or more middle school topics including, by way of non-limiting examples, algebra, American literature, biology, chemistry, composition, computer skills, drawing, earth science, ethics, geography, geometry, grammar, journalism, photography, physical education, poetry, pre-algebra, reading, spelling, U.S. government, U.S. history, world history, and writing.

In some embodiments, one or more areas of skill, interest, or expertise are selected from high school subjects including, by way of non-limiting examples, language arts, mathematics, social studies, science, music and other performing arts, visual arts, additional languages, health, fitness and sports, and information technology. In further embodiments, the subjects include one or more high school topics including, by way of non-limiting examples, U.S. history, U.S. government, world history, European history, economics, geography, psychology, sociology, anthropology, philosophy, biology, ecology, anatomy, physiology, chemistry, physics, earth science, astronomy, algebra, statistics, geometry, calculus, trigonometry, grammar, spelling, writing, American literature, European literature, English literature, world literature, composition, poetry, drawing, painting, photography, film, theatre, journalism, computer skills, computer science, computer programming, business, physical education, and sign language.

In some embodiments, one or more areas of skill, interest, or expertise are selected from higher education subjects including, by way of non-limiting examples, language arts, mathematics, social studies, science, music and other performing arts, visual arts, additional languages, health, fitness and sports, and information technology. In further embodiments, the subjects include one or more higher education topics including, by way of non-limiting examples, U.S. history, U.S. government, world history, European history, economics, macroeconomics, microeconomics, psychology, sociology, anthropology, philosophy, law, political science, education, urban studies, women's studies, biology, botany, ecology, environmental studies, anatomy, physiology, virology, pharmacology, cell biology, molecular biology, microbiology, genetics, medicine, neuroscience, chemistry, organic chemistry, biochemistry, physical chemistry, biophysics, physics, earth science, astronomy, astrophysics, algebra, statistics, geometry, calculus, trigonometry, electrical engineering, civil engineering, mechanical engineering, chemical engineering, writing, American literature, European literature, English literature, world literature, composition, poetry, music theory, religion, drawing, painting, photography, film, theatre, journalism, computer science, computer programming, business, business administration, accounting, nursing, law enforcement, physical education, and sign language.

In some embodiments, one or more areas of skill, interest, or expertise are selected from language arts topics including, by way of non-limiting examples, phonics, reading, vocabulary, spelling, grammar, writing, composition, public speaking, American literature, world literature, and poetry.

In some embodiments, one or more areas of skill, interest, or expertise are selected from mathematics topics including, by way of non-limiting examples, mathematics, algebra, geometry, calculus, trigonometry, probability, statistics, number theory, applied mathematics, logic, and topology.

In some embodiments, one or more areas of skill, interest, or expertise are selected from social studies topics including, by way of non-limiting examples, political science, law, U.S. government, U.S. history, world history, geography, economics, archaeology, anthropology, sociology, communication, and psycho logy.

In some embodiments, one or more areas of skill, interest, or expertise are selected from science topics including, by way of non-limiting examples, health, nutrition, biology, ecology, environmental science, meteorology, oceanography, marine biology, hydrology, soil science, botany, anatomy, physiology, virology, pharmacology, cell biology, molecular biology, microbiology, genetics, medicine, pathology, neuroscience, zoology, chemistry, organic chemistry, biochemistry, physical chemistry, materials science, biophysics, physics, optics, earth science, electrical engineering, civil engineering, mechanical engineering, chemical engineering, paleontology astronomy, astrophysics, and computer science.

In some embodiments, one or more areas of skill, interest, or expertise are selected from arts topics including, by way of non-limiting examples, writing, composition, poetry, art, music, music theory, drawing, painting, photography, film, theatre, dance, sculpture, and art history.

In some embodiments, one or more areas of skill, interest, or expertise are selected from languages including, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog.

In some embodiments, one or more areas of skill, interest, or expertise are selected from health, sports, and fitness topics including, by way of non-limiting examples, health, nutrition, physical education, archery, baseball, basketball, boating, bowling, cheerleading, cricket, cycling, field hockey, football, golf, hiking, ice hockey, lacrosse, martial arts, water polo, rock climbing, roller hockey, rugby, running, skiing, soccer, surfing, swimming, and walking.

In some embodiments, one or more areas of skill, interest, or expertise are selected from information technology topics including, by way of non-limiting examples, computer skills, Internet safety, computer programming, computer networking, and computer science.

In some embodiments, one or more areas of skill, interest, or expertise are selected from professional topics including, by way of non-limiting examples, continuing legal education, continuing medical education, and continuing education for teachers, accountants, tax preparers, physical therapists, occupational therapists, psychologists, nurses, and nurse practitioners.

In some embodiments, one or more areas of skill, interest, or expertise are selected from professional skills including, by way of non-limiting examples, organization, leadership, time management, negotiation, harassment awareness, conflict management, interviewing, and networking.

Learning Activities

The systems, platforms, servers, programs, and methods described herein include a plurality of learning activities. In some embodiments, each activity is substantially related to one or more specific areas of skill, interest, or expertise. In some embodiments, one or more activities are selected from informal activities including, by way of non-limiting examples, demonstrations, how-to-articles, how-to-videos, and simulations. In some embodiments, one or more activities are selected from preschool activities including, by way of non-limiting examples, songs, chants, books, poems, puzzles, games, art activities, and printable activities. In some embodiments, one or more activities are selected from K-12 activities including, by way of non-limiting examples, books, games, puzzles, art, music, reading assignments, articles, videos, demonstrations, simulations, quizzes, examinations, worksheets, problem sets, brainstorms, and journals. In some embodiments, one or more activities are selected from higher education activities including, by way of non-limiting examples, books, reading assignments, lectures, articles, videos, demonstrations, simulations, mock examinations, quizzes, examinations, essays, laboratory experiments, problem sets, brainstorms, and journals. In some embodiments, one or more activities are selected from professional activities including, by way of non-limiting examples, books, articles, brainstorms, collaborations, group activities, multi-player games, videos, lectures, role-plays, simulations, demonstrations, quizzes, and exams.

In some embodiments, the plurality of activities is organized according to an instructional plan designed to accomplish one or more educational objectives in at least one area of skill, interest, or expertise through the mutual reinforcement of individual activities. In further embodiments, an instructional plan interconnects two or more activities associated with a subject in such a way that understanding is built progressively with one or more activities adding to the educational messages of one or more previous activities. In some embodiments, an instructional designer constructs an instructional plan. In other embodiments, a mentor to a learner constructs an instructional plan. In other embodiments, a software module constructs an instructional plan according to the requirements of one or more published educational standards.

In various embodiments, an instructional plan addresses, by way of non-limiting examples, a lesson, a learning unit, and a level of study. In some embodiments, an instructional plan addresses a lesson, which is one or more learning activities that teach toward a specific educational objective or a specific element of a published educational standard. In some embodiments, an instructional plan addresses a learning unit, which is one or more lessons that teach toward a general educational objective or a general element of a published educational standard. In some embodiments, an instructional plan addresses a level of study, which is one or more learning units that teach toward a plurality of general educational objectives or an overarching element of a published educational standard.

In some embodiments, an instructional plan identifies one or more learning activities for use in a guided environment. In further embodiments, an instructional plan identifies one or more learning activities for use in a guided environment by interacting with a software module for displaying and providing access to said one or more learning activities in a guided environment. In still further embodiments, an instructional plan identifies one or more learning activities for use in a guided environment by referring activities to a software module for displaying and providing access to said one or more learning activities in a guided environment. In some embodiments, an instructional plan identifies one or more learning activities for assignment as independent work. In further embodiments, an instructional plan identifies one or more learning activities for assignment as independent work by interacting with a software module for assigning said one or more learning activities as independent work to one or more learners. In still further embodiments, an instructional plan identifies one or more learning activities for assignment as independent work by referring activities to a software module for assigning said one or more learning activities as independent work to one or more learners. In some embodiments, an instructional plan identifies one or more learning activities by, for example, title, name, number, or by one or more representative images.

In some embodiments, learning activities include visual and audio content, for example, text, images, video, audio, motion, interactivity, and animation. In further embodiments, interactive content allows a learner to interact with the learning activity through text, hyperlinks, graphical icons and other visual elements, manipulation of graphical elements, auditory elements, and motion elements. In view of the disclosure provided herein, learning activities are created by techniques known to those of skill in the art using machines, software, and languages known to the art. Those of skill in the art will recognize that several digital multimedia formats are suitable including, by way of non-limiting examples, Flash®, QuickTime®, Real Media®, Windows Media®, Silverlight®, Java™, HTML 5, XHTML 5, Unity®, Audio Video Interleave (AVI), and Moving Pictures Expert Group (MPEG).

In some embodiments, one or more activities are available in a language other than English in order to facilitate the education of non-English speaking learners. In other embodiments, one or more activities are available in a language other than English in order to address a language curriculum. In further embodiments, one or more activities are available in one or more languages including, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog.

Displaying and Providing Access to Activities in a Guided Environment

The systems, platforms, servers, programs, and methods described herein include a software module for displaying and providing access to learning activities in a guided environment. A guided environment is an educational environment, such as a live, recorded, remote, or online environment where learning activities are directed or guided by one or more mentors. Guided environments include, for example, classrooms, laboratories, and e-learning environments. The learning activities performed by learners in a guided environment are referred to herein as guided work.

As described herein, in some embodiments, the learning activities are organized according to an instructional plan designed to accomplish one or more educational objectives in at least one area of skill, interest, or expertise through the mutual reinforcement of individual activities. In further embodiments, an instructional plan interconnects two or more activities associated with a subject in such a way that understanding is built progressively with one or more activities adding to the educational messages of one or more previous activities. In some embodiments, the software module is adapted for use by a mentor and further adapted to support a mentor's implementation of an instructional plan. In further embodiments, the software module is only available to a person identified by the lesson delivery server as a mentor. In other embodiments, access to the module is not restricted.

In some embodiments, the software module for displaying and providing access to learning activities in a guided environment provides access to an instructional plan. In further embodiments, an instructional plan is available, for example, in text format, outline format, or a graphical format. In other embodiments, the software module does not provide access to an instructional plan, but provides access to learning activities organized according to a plan. In some embodiments, an instructional plan identifies one or more learning activities for use in a guided environment (e.g., guided work). In further embodiments, the software module for displaying and providing access to learning activities in a guided environment displays and provides access to those learning activities identified by an instructional plan as guided work. In some embodiments, a mentor identifies one or more learning activities for use in a guided environment. In further embodiments, the software module for displaying and providing access to learning activities in a guided environment displays and provides access to those learning activities identified as guided work by a mentor. In other embodiments, the software module for displaying and providing access to learning activities in a guided environment displays and provides access to all learning activities associated with the lesson delivery server.

In some embodiments, the software module for displaying and providing access to learning activities in a guided environment displays the name of an associated lesson, learning unit, level of study, or instructional plan. In some embodiments, the software module displays, by way of non-limiting examples, the names of learning activities, the topics of learning activities, the types of learning activities. In some embodiments, the software module displays one or more images associated with each learning activity. In further embodiments, an image is a photograph, screen capture, video, illustration, or animation. In some embodiments, the display is organized to communicate a relationship between the learning activities. In further embodiments, the display is organized to communicate a sequence, hierarchy, grouping, relative complexity, or relative difficulty. In some embodiments, the display is adapted for use by a mentor in a guided learning environment. In further embodiments, the display is adapted for use by a teacher in a classroom environment.

In some embodiments, the software module for displaying and providing access to learning activities in a guided environment provides hyperlinks to learning activities to support the mentor's use or demonstration of the activity in a guided environment. In some embodiments, the software module provides access to full-length, full-feature learning activities. In other embodiments the software module provides access to truncated or simplified activities. In some embodiments, a mentor accesses a learning activity in a guided environment as part of live or recorded teaching. In further embodiments, a mentor accesses a learning activity in a guided environment to model or demonstrate the activity to learners.

In some embodiments, the software module is contextual such that it displays and provides access to learning activities that are appropriate for, by way of non-limiting examples, the current topic a mentor is addressing in a guided environment, the current section of an instructional plan a mentor is addressing in a guided environment, or the current navigational state of a e-learning lesson delivery server. In other embodiments, the software module is non-contextual and displays and provides access to all learning activities associated with the lesson delivery server.

Figure 2:
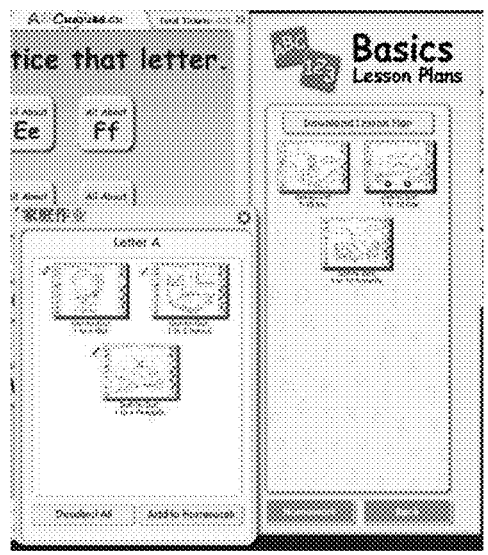
FIG. 2 (right) shows a non-limiting example of a software module for displaying and providing access to learning activities in a guided environment; in this case, a software module displaying and providing access to learning activities organized according to an instructional plan designed to accomplish an educational objective in counting, where the module is adapted to support a mentor's implementation of said instructional plan.

Referring to FIG. 2, in particular embodiments, the software module for displaying and providing access to learning activities in a guided environment is available via a tabbed navigational side bar of a web-based lesson delivery application. In further embodiments, the software module includes a hyperlinked button providing access to an instructional plan that identifies particular learning activities as guided work and particular learning activities as independent work. In still further embodiments, the software module displays the name of particular learning activities identified as guided work and for use by a mentor in a guided environment, such as a classroom or training room. In still further embodiments, the software module displays a representative image for each activity. In still further embodiments, the text and image associated with each activity is hyperlinked to the learning activity such that a mentor can quickly and easily access the learning activities in a guided environment. Continuing to refer to FIG. 2, in a particular embodiment, the software module for displaying and providing access to learning activities in a guided environment is contextual and displays the learning activities appropriate for the current navigational state of a larger web-based lesson delivery server.

In some embodiments, to further the purpose of supporting a mentor's implementation of an instructional plan, the software module for displaying and providing access to learning activities in a guided environment is implemented, in part or in whole, as part of a web application, a mobile application, a standalone application, or an extension to a web browser application.

Assigning Activities as Independent Work

The systems, platforms, servers, programs, and methods described herein include a software module for assigning one or more learning activities as independent work to one or more learners. Independent work is work suggested or assigned by a mentor to be attempted or performed by one or more learners without continuous guidance. Independent work, as used herein, can include homework or work performed in a guided environment where a mentor is present, but not continuously providing guidance. In some cases, independent work is to be attempted or performed by individual learners. In other cases, independent work is to be attempted or performed by groups of learners in collaboration. In some embodiments, the software module is adapted for use by a mentor and further adapted to support a mentor's implementation of an instructional plan. In further embodiments, the software module is only available to a person identified by the lesson delivery server as a mentor.

In some embodiments, an instructional plan identifies one or more learning activities for assignment as independent work. In further embodiments, the software module for assigning one or more learning activities as independent work to one or more learners allows assignment of those learning activities identified by an instructional plan as independent work. In some embodiments, a mentor identifies one or more learning activities for assignment as independent work. In further embodiments, the software module for assigning one or more learning activities as independent work to one or more learners allows assignment of those learning activities identified as independent work by a mentor. In other embodiments, the software module for displaying and providing access to learning activities in a guided environment allows assignment of any learning activity associated with the lesson delivery server.

In various embodiments, the software module for assigning learning activities as independent work allows a mentor to sort, search, or filter learning activities by, for example, area of skill, interest, or expertise, educational objective, name, length, or difficulty. In various embodiments, the software module for assigning learning activities as independent work displays information about learning activities to assist a mentor in identification and selection of specific activities including, by way of non-limiting example, name, type, area of skill, interest, or expertise, educational objective, length, difficulty, associated lesson, learning unit, level of study, or instructional plan, and associated image or screen capture. In various embodiments, the software module for assigning learning activities as independent work further assists a mentor in identification and selection of specific activities by displaying activities available for assignment in a way that is organized to communicate a sequence, hierarchy, grouping, relative complexity, or relative difficulty. In some embodiments, the software module for assigning learning activities as independent work allows a mentor to preview learning activities to learners in a guided environment prior to assignment of the activities as independent work. In further embodiments, the preview is of a truncated or simplified version of the activity. In other embodiments, the preview is of a full-length, full-featured version of the activity.

In some embodiments, a mentor selects activities for assignment as independent work by selecting elements associated with a learning activity including, by way of non-limiting examples, text, icons, check boxes, or other form elements. In some embodiments, a mentor selects elements associated with learning activities using a pointing device including, by way of non-limiting examples, a mouse, trackball, track pad, or stylus. In further embodiments, a mentor makes selections with a pointing device with actions including, by way of non-limiting examples, clicking, double clicking, right clicking, shift clicking, control clicking, command clicking, dragging, or drawing a line, circle, or other shape. In some embodiments, a mentor selects elements associated with learning activities using a touch screen or multi-touch screen. In further embodiments, a mentor makes selections with a touch screen or multi-touch screen with actions including, by way of non-limiting examples, tapping, double tapping, dragging, pinching, or drawing a line, circle, or other shape. In other embodiments, a mentor selects elements associated with learners using a microphone to capture voice or other sound input. In some embodiments, a mentor selects learners using a keyboard, or alternative text input device, by typing names of learning activities or other text associated with learning activities.

In further embodiments, a mentor assigns a learning activity as independent work for, by way of non-limiting examples, a single learner, group of learners, and a class of learners. In various embodiments, the software module allows a mentor to configure additional parameters for each learning activity assigned as independent work including, by way of non-limiting examples, due date, overdue date, point value, learner notifications, and the amount of time the independent work is available to a software module for displaying and providing access to learning activities assigned as independent work. In some embodiments, the software module for assigning learning activities as independent work is accessible only by a person identified by the lesson delivery server as a mentor. In other embodiments, access to the module is not so restricted.

Figure 3:
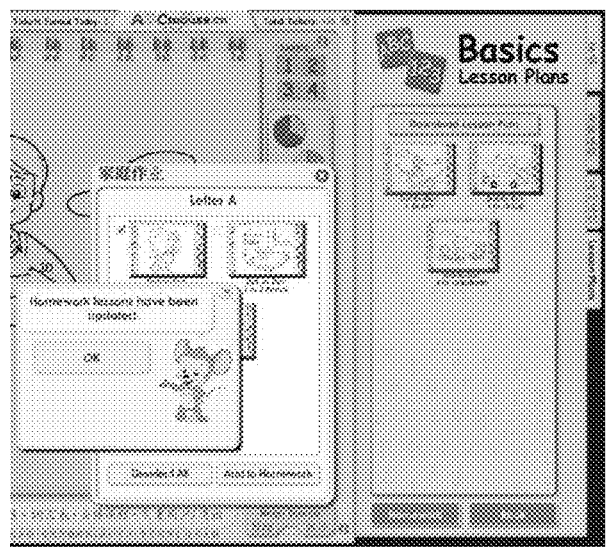
FIG. 3 (left) shows a non-limiting example of a software module for assigning learning activities as independent work to learners; in this case, a software module that is only accessible to a mentor.

Referring to FIG. 3, in particular embodiments, the software module for assigning learning activities as independent work is available via a tabbed navigational side bar of a web-based lesson delivery application. In further embodiments, the software module recommends particular learning activities for assignment as independent work based on an instructional plan. In still further embodiments, the software module displays the name of particular learning activities recommended for assignment as independent work. In still further embodiments, the software module displays a representative image for each activity. In still further embodiments, the text and image associated with each activity is hyperlinked to the learning activity such that a mentor can quickly and easily preview the learning activities in a guided environment, such as a classroom. In a particular embodiment, a mentor assigns activities from among those recommended by interacting with checkboxes. Continuing to refer to FIG. 3, in a particular embodiment, the software module for displaying and providing access to learning activities in a guided environment is contextual and displays the learning activities appropriate for the current navigational state of a larger web-based lesson delivery server.

In some embodiments, to further the purpose of supporting a mentor's implementation of an instructional plan, the software module for assigning one or more learning activities as independent work to one or more learners is implemented, in part or in whole, as part of a web application, a mobile application, a standalone application, or an extension to a web browser application.

Displaying and Providing Access to Activities Assigned as Independent Work

The systems, platforms, servers, programs, and methods described herein include a software module for displaying and providing access to learning activities assigned as independent work. In some embodiments, the software module for displaying and providing access to learning activities assigned as independent work is adapted for use by a learner to quickly and easily identify activities they are asked or assigned to complete outside of a continuously guided environment and provide access to those learning activities. In further embodiments, the software module is accessible to a learner or to a mentor.

In various embodiments, the software module for displaying and providing access to learning activities assigned as independent work allows a learner to sort, search, or filter learning activities by, for example, area of skill, interest, or expertise, educational objective, name, date assigned, due date, overdue date, length, or difficulty. In various embodiments, the software module for displaying and providing access to learning activities assigned as independent work displays information about learning activities to assist a learner in selecting and completing specific activities including, by way of non-limiting example, name, type, area of skill, interest, or expertise, educational objective, length, difficulty, associated lesson, learning unit, level of study, or instructional plan, and associated image or screen capture. In various embodiments, the software module for displaying and providing access to learning activities assigned as independent work further assists a learner in identification and selection of specific activities by displaying activities assigned in a way that is organized to communicate a sequence, hierarchy, grouping, relative complexity, or relative difficulty.

In some embodiments, the software module for displaying and providing access to learning activities assigned as independent work is further configured to generate electronic notifications for one or more learners. In various embodiments, the software module generates notifications for, by way of non-limiting examples, new assignments, approaching due dates, and approaching overdue dates. In various embodiments, the software module generates notifications in forms including, by way of non-limiting examples, SMS, MMS, email, webmail, blog post, microblog post, social network message, and voicemail.

Figure 4:
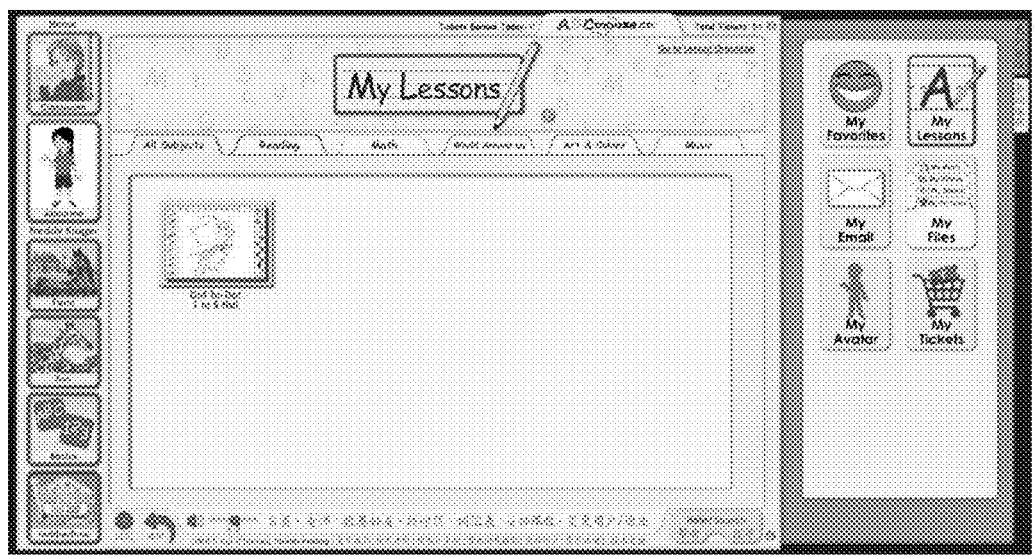
FIG. 4 shows a non-limiting example of a software module for displaying and providing access to learning activities assigned as independent work; in this case, a software module displaying and providing access to a learning activity designed to accomplish an educational objective in counting, where the module is accessible to learners and their mentors.

Referring to FIG. 4, in particular embodiments, the software module for displaying and providing access to learning activities assigned as independent work presents activities organized by subject. In further embodiments, learners sort activities assigned as independent work by subject. Continuing to refer to FIG. 4, in particular embodiments, learning activities assigned as independent work are identified by subject, name, and a representative image in the form of a screen capture. In further embodiments, the name and image for each assigned learning activity are hyperlinked to the activity and provide direct access to the activity.

In some embodiments, to further the purpose of supporting a learner's completion of independent learning activities, the software module for displaying and providing access to learning activities assigned as independent work is implemented, in part or in whole, as part of a web application, a mobile application, a standalone application, or an extension to a web browser application.

Monitoring Learner Progress

The systems, platforms, servers, programs, and methods described herein further comprise a software module for monitoring the progress of one or more learners. In some embodiments, the software module for monitoring learner progress is adapted for use by a mentor to one or more learners. In further embodiments, the software module is only accessible by a mentor. In various embodiments, the software module for monitoring learner progress allows a mentor to monitor the progress of, for example, a single learner, a group of learners, or a class of learners. In further embodiments, the progress of a group or class of learners is monitored in aggregate. In other embodiments, the progress of a group or class of learners is monitored at the level of individual learners. In some embodiments, the software module for monitoring learner progress is adapted for use by a learner. In further embodiments, the software module is accessible by a mentor or a learner. In still further embodiments, the software module for monitoring learner progress allows a learner to monitor their own progress. In still further embodiments, the software module for monitoring learner progress allows a learner to compare their progress to the aggregate progress of a group or class of learners. In still further embodiments, the software module for monitoring learner progress allows a learner to compare their progress to that expected by a mentor.

In some embodiments, the software module for monitoring learner progress generates an on-screen progress report. In further embodiments, the software module generates a printable progress report. In some embodiments, the software module reports the names of each learning activity assigned. In some embodiments, the software module reports the names of each learning activity completed. In some embodiments, the software module for monitoring learner progress reports the number of learning activities completed. In further embodiments, the software module reports the percentage of activities completed within a specific group of activities. In still further embodiments, the software module reports the number of times each activity has been completed by a learner. In various embodiments, the software module reports, for example, the date of assignment for each learning activity, the date of completion for each learning activity, the difficulty of each learning activity, and the number of days past due for each learning activity. In some embodiments, the software module reports the educational objectives achieved. In further embodiments, the educational objectives achieved are reported in conjunction with the objectives of an instructional plan or the objectives in a published educational standard. In some embodiments, the software module reports learner progress within an overall instructional plan or published educational standard. In some embodiments, the software module for monitoring learner progress identifies learning activities assigned as independent work. In further embodiments, the software module allows monitoring of independent activities separately from other activities.

Figure 5:
FIG. 5 shows a non-limiting example of a navigational menu for accessing a software module for monitoring the progress of a learner; in this case, a menu for accessing reports on a learner's progress toward a plurality of categories of learning objectives.
Figure 6:
FIG. 6 shows a non-limiting example of a software module for monitoring the progress of a learner; in this case, a module reporting information about a learner's progress toward one category of learning objectives (e.g., the English alphabet). The software module displays a title and an icon for each learning activity associated with the category of learning objectives. The module also reports information regarding which activities have been completed by a learner (as indicated by a star) and how many times each has been completed (as indicated by a number).

Referring to FIG. 5, in particular embodiments, the software module for monitoring learner progress organizes information about learner progress based on a plurality of categories of educational objectives. Now referring to FIG. 6, in particular embodiments, the software module for monitoring learner progress reports information regarding each learning activity that teaches toward each category of educational objectives. In further embodiments, the software module reports whether each activity has been completed and how many times it has been completed.

In light of the disclosure provided herein, those of skill in the art will recognize that in various embodiments a software module for monitoring the progress of one or more learners is implemented in a multitude of ways. In some embodiments, the software module for monitoring the progress of one or more learners is a feature integrated into one or more GUIs of the lesson delivery server described herein. In further embodiments, the software module is accessible by interacting with a link or icon integrated into a GUI. In some embodiments, the software module for monitoring learner progress comprises a web browser plug-in, add-in, add-on, or extension. In further embodiments, a web browser, plug-in, add-in, add-on, or extension is accessible via, by way of non-limiting examples, click, right click, menu selection, keystroke, touchscreen gesture, or voice command. In some embodiments, the software module for monitoring learner progress comprises a standalone application, which is a program that is run as an independent computer process, not an add-on to an existing process. In further embodiments, a standalone application monitoring learner progress is compiled and executable. In some embodiments, a standalone application is in communication with and adapted for use in conjunction with a lesson delivery server, which is implemented separately. In some embodiments, the software module for monitoring learner progress comprises a mobile application. In further embodiments, a mobile application is in communication with and adapted for use in conjunction with a lesson delivery server, which is implemented separately.

Digital Processing Device

The systems, platforms, servers, programs, and methods described herein include a digital processing device. The digital processing device includes one or more hardware central processing units (CPU) that carry out the device's functions. The digital processing device further comprises an operating system configured to perform executable instructions. In some embodiments, the digital processing device further comprises a memory device, a display, an input device, and optionally a sound output device. In some embodiments, the digital processing device is connected to the Internet such that it accesses the World Wide Web. In other embodiments, the digital processing device is connected to an intranet. In other embodiments, the digital processing device is connected to a data storage device. In some embodiments, the digital processing device is a non-portable device, such as a server or a desktop computer. In other embodiments the digital processing device is a portable device, such as a laptop or tablet computer. In other embodiments the digital processing device is a mobile device, such as a smartphone or digital music player.

The digital processing device includes an operating system configured to perform executable instructions. The operating system is, for example, software, including programs and data, which manages the device's hardware and provides services for execution of applications. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the digital processing device includes a memory device. The memory is one or more physical apparatus used to store data or programs on a temporary or permanent basis. In some embodiments, the memory is volatile and requires power to maintain stored information. In some embodiments, the memory is non-volatile and retains stored information when the digital processing device is not powered.

In some embodiments, the digital processing device includes a visual display. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is a plasma display. In other embodiments, the display is a video projector. In still further embodiments, the display is a combination of devices such as those disclosed herein.

In some embodiments, the digital processing device includes an input device. In some embodiments, the input device is a keyboard or keypad. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the digital processing device optionally includes a sound output device. In some embodiments, the sound output device is a pair of headphones, earphones, or ear buds. In some embodiments, the sound output device is an electro-acoustic transducer or loudspeaker. In further embodiments, the sound output device is a flat panel loudspeaker, a ribbon magnetic loudspeaker, or a bending wave loudspeaker. In other embodiments, the sound output device is a piezoelectric speaker. In still further embodiments, the sound output device is a combination of devices such as those disclosed herein.

In accordance with the description provided herein, suitable digital processing devices include, by way of non-limiting examples, server computers, desktop computers, laptop computers, notebook computers, tablet computers, netbook computers, smartbook computers, subnotebook computers, ultra-mobile PCs, handheld computers, personal digital assistants, Internet appliances, smartphones, music players, and portable video game systems. Those of skill in the art will recognize that many mobile smartphones are suitable for use in the system described herein. Suitable tablet computers include those with booklet, slate, and convertible configurations, known to those of skill in the art. Suitable portable video game systems include, by way of non-limiting examples, Nintendo DS™ and Sony® PSP™.

Computer Network

The systems, platforms, servers, programs, and methods disclosed herein include a digital processing device that is optionally connected to a computer network. A computer network is a collection of computers and/or devices interconnected by communications channels that facilitate communications among users and allow users to share resources. In view of the disclosure provided herein, the computer network is created by techniques known to those of skill in the art using hardware, firmware, and software known to the art. In some embodiments, the computer network is a private network such as an intranet. In some embodiments, the computer network is the Internet. In further embodiments, the Internet provides access to the World Wide Web and the computer program and/or mobile application is provided to the digital processing device via the Web. In still further embodiments, the Internet provides access to the World Wide Web and the computer program and/or mobile application is provided to the digital processing device via cloud computing. In other embodiments, the computer network comprises data storage devices including, by way of non-limiting examples, CD-ROMs, DVDs, flash memory devices, solid state memory, magnetic disk drives, magnetic tape drives, optical disk drives, cloud computing systems and services, and the like. In further embodiments, the computer program and/or mobile application is provided to the digital processing device via a data storage device.

Computer Readable Medium

In some embodiments, the systems, platforms, servers, programs, and methods disclosed herein include one or more computer readable media encoded with a program including instructions executable by the operating system of an optionally networked digital processing device, wherein said instructions create a social shopping networking service. In further embodiments, a computer readable medium is a tangible component of a digital processing device. In still further embodiments, a computer readable medium is optionally removable from a digital processing device. In some embodiments, a computer readable medium includes, by way of non-limiting examples, CD-ROMs, DVDs, flash memory devices, solid state memory, magnetic disk drives, magnetic tape drives, optical disk drives, cloud computing systems and services, and the like.

Computer Program

The systems, platforms, servers, programs, and methods disclosed herein include at least one computer program. The computer program includes a sequence of instructions, executable in the digital processing device's CPU, written to perform a specified task. Those of skill in the art will recognize that the computer program may be written in various versions of various languages. In some embodiments, the computer program comprises one sequence of instructions. In some embodiments, the computer program comprises a plurality of sequences of instructions. In some embodiments, the computer program is delivered from one location. In other embodiments, the computer program is delivered from a plurality of locations. In some embodiments, the computer program is delivered from a cloud computing service. In various embodiments, the computer program comprises, in part or in whole, one or more web applications, one or more mobile applications, one or more standalone applications, one or more web browser plug-ins, extensions, add-ins, or add-ons, or combinations thereof.

Web Application

In some embodiments, the computer program includes a web application written in one or more markup languages, style languages, client-side scripting languages, server-side coding languages, or combinations thereof. In some embodiments, the computer program is written to some extent in a markup language such as Hypertext Markup Language (HTML), Extensible Hypertext Markup Language (XHTML), or eXtensible Markup Language (XML). In some embodiments, the computer program is written to some extent in a style language such as Cascading Style Sheets (CSS). In some embodiments, the computer program is written to some extent in a client-side scripting language such as Asynchronous Javascript and XML (AJAX), Actionscript, Javascript, or Silverlight®. In some embodiments, the computer program is written to some extent in a server-side coding language such as Active Server Pages (ASP), ColdFusion®, Perl, Java™, Hypertext Preprocessor (PHP), Python™, and Ruby. In some embodiments, the computer program utilizes a web framework such as Ruby on Rails (RoR) or .NET. In some embodiments, the computer program is written to some extent in a query language such as Structured Query Language (SQL). In some embodiments, the computer program utilizes a database system such as Microsoft® SQL Server, mySQL™, and Oracle®.

In some embodiments, the lesson delivery server is implemented as a web application. In further embodiments, the learning activities organized according to an instructional plan are part of a web application. In further embodiments, the software module for displaying and providing access to one or more learning activities in a guided environment is part of a web application. In further embodiments, the software module for software module for assigning one or more learning activities as independent work is part of a web application. In further embodiments, the software module for software module for displaying and providing access to learning activities assigned as independent work is part of a web application.

Mobile Application

In some embodiments, the computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, the mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Those of skill in the art will also recognize that mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone® and iPad® (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the lesson delivery server is implemented as a mobile application. In some embodiments, the learning activities organized according to an instructional plan are implemented as or more mobile applications. In some embodiments, the software module for displaying and providing access to one or more learning activities in a guided environment is implemented as a mobile application. In some embodiments, the software module for software module for assigning one or more learning activities as independent work is implemented as a mobile application. In some embodiments, the software module for software module for displaying and providing access to learning activities assigned as independent work is implemented as a mobile application.

Standalone Application

In some embodiments, the computer program includes a standalone application, which is a program that is run as an independent computer process, not an add-on to an existing process, e.g. not a plug-in. Those of skill in the art will recognize that standalone applications are often compiled. A compiler is a computer program(s) that transforms source code written in a programming language into binary object code such assembly language or machine code. Suitable compiled programming languages include, by way of non-limiting examples, C, C++, Objective-C, COBOL, Delphi, Eiffel, Java™, Lisp, Visual Basic, and VB .NET, or combinations thereof. Compilation is often performed, at least in part, to create an executable program. In some embodiments, the computer program includes one or more executable complied applications.

In some embodiments, the lesson delivery server is implemented as a standalone application. In some embodiments, the learning activities organized according to an instructional plan are implemented as or more standalone applications. In some embodiments, the software module for displaying and providing access to one or more learning activities in a guided environment is implemented as a standalone application. In some embodiments, the software module for software module for assigning one or more learning activities as independent work is implemented as a standalone application. In some embodiments, the software module for software module for displaying and providing access to learning activities assigned as independent work is implemented as a standalone application.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, sub-notebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm®

WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

In some embodiments, the software module for displaying and providing access to one or more learning activities in a guided environment is implemented as a web browser extension, plug-in, add-in, or add-on. In some embodiments, the software module for software module for assigning one or more learning activities as independent work is implemented as a web browser extension, plug-in, add-in, or add-on. In some embodiments, the software module for software module for displaying and providing access to learning activities assigned as independent work is implemented as a web browser extension, plug-in, add-in, or add-on.

Software Modules

The systems, platforms, servers, programs, and methods disclosed herein include, in various embodiments, software, server, and database modules. In view of the disclosure provided herein, the software modules are created by techniques known to those of skill in the art using machines, software, and languages known to the art. In some embodiments, the software modules are in one computer program or application. In other embodiments, the software modules are in more than one computer program or application. In some embodiments, the software modules are hosted on one machine. In other embodiments, the software modules are hosted on more than one machine. In some embodiments, the software modules are hosted on one or more machines in one location. In other embodiments, the software modules are hosted on one or more machines in more than one location.

EXAMPLES

The following illustrative examples are representative of embodiments of the systems, platforms, servers, programs, and methods described herein and are not meant to be limiting in any way.

Example 1

A 31-year-old high school biology teacher is teaching a learning unit on mitosis in plant and animal cells. To teach the unit, he is implementing an instructional plan developed by committee within the school's science department. The plan is based on published state standards for science education. The instructional plan includes a title, a summary, and five clearly stated educational objectives. For each day that the teacher plans to spend on the mitosis unit, the instructional plan includes a list of interactive learning activities for use in the classroom environment and a list of interactive learning activities for assignment as independent work. The teacher plans to use a desktop computer connected to an LCD projector and a web-based lesson delivery server to demonstrate for the class events depicted in the learning activities identified as for use in the classroom. The teacher plans to assign the activities identified for assignment as independent work as either homework or work that his students will complete in class, but while he is not continuously guiding the work.

On the first day of the mitosis unit, the teacher uses the web browser on his computer to access a software module of the lesson delivery server that is for displaying and providing access to learning activities in a guided environment such as a classroom. The software module provides him with a convenient link to an outline of the instructional plan. The module also provides the teacher with linked names and images for each learning activity identified in the plan as for use in class. The teacher delivers the lesson and is able to quickly access and display each activity to the class. When the attention of the students begins to drift, he uses the module to quickly move on to the next activity. The teacher is able to stay on topic and introduce all of the information that he set out to.

Example 2

Referring to the teacher in Example 1, during the lesson, the teacher notices that several of the students in his class seemed particularly interested by the fact that the DNA molecules in each human cell, if stretched out and placed end to end, would be over 2 meters long. When the teacher noticed that this idea seemed intriguing to some, he immediately used his mouse to access a software module associated with the lesson delivery server for assigning learning activities as independent work. The module provides the teacher with linked names and images for each learning activity identified in the plan as for assignment as independent work. The teacher quickly identified a learning activity focused on histones and their role in packaging and ordering DNA into nucleosomes using a list of names and images presented by the software module. By clicking a checkbox next to the name and image of the learning activity, he instantly assigns participation in the activity to the entire class as homework. While the due date is configurable, the default is for a due date of the next school day.

Example 3

Each student in the class described in Example 2 is assigned an Apple® iPad® that is connected to the World Wide Web via a 3G cellular telecommunications network. Some students have installed a mobile application on their tablets which is in communication with the lesson delivery server. The mobile application includes a software module for displaying and providing access to learning activities assigned as independent work. Those students who use the mobile application are immediately sent a MMS with the name of the activity assigned as homework, an image of the activity, a notice regarding the due date, and a hyperlink to access the activity. Other students in the class access the software module for displaying and providing access to learning activities assigned as independent work via a web browser on their tablets. Those students are immediately sent an email to their school web-based email accounts. The email similarly contains the name of the activity assigned as homework, an image of the activity, a notice regarding the due date, and a hyperlink to access the activity. When students access the software module, they are presented with all of their assigned homework, including the biology activity on histone proteins, in a GUI that is sortable by class subject. The module presents the name of each activity, its due date, and a representative image of each activity. The text and image associated with each learning activity is linked directly to the activity. The teacher expects all his students to use the hyperlinks to access and participate in the assigned learning activity before the start of class the next school day.

Example 4

Referring to the teacher in Example 3, at 8:45 PM, the teacher uses his home laptop to access a web-based software module for monitoring the progress of his students. The module is in communication with the lesson delivery server and is not accessible to the students. The software module presents aggregate data reflecting the percentage of the class that has attempted most recently assigned independent learning activity and the percentage of the class that has completed the activity. The teacher can see that 55% of his class has accessed the learning activity and 48% have completed the activity. The teacher navigates the GUI offered by the software module to view individual data for this independent assignment. He uses a notification feature of the module to send a reminder message to only those students who have not yet attempted the learning activity. Instantaneously, the appropriate students are sent a reminder in the electronic communications method of their choice. Some students receive a MMS, others receive an email. The next day, just before his biology class starts, the teacher re-checks the progress report created by the software module for monitoring the progress of his students. He sees that only three students have not completed the learning activity. He begins the next lesson by asking those three students questions about histones to determine if they have enough understanding to move on to the next related topic.

What is claimed is:

1. An e-learning lesson delivery platform comprising:
   (a) a digital processing device that is optionally connected to a computer network, wherein said processing device comprises an operating system configured to perform executable instructions; and
   (b) a computer program, provided to said digital processing device, including executable instructions that create a lesson delivery server, wherein said server comprises:
      i. a plurality of learning activities, wherein said activities are organized according to an instructional plan designed to accomplish one or more educational objectives in at least one area of skill, interest, or expertise, wherein said plan identifies one or more learning activities for use in a guided environment and identifies one or more learning activities for assignment as independent work;
      ii. a software module for displaying and providing access to said one or more learning activities in a guided environment, wherein said module for displaying and providing access to said one or more learning activities in a guided environment is adapted to support a mentor's implementation of said instructional plan;
      iii. a software module for assigning said one or more learning activities as independent work to one or more learners, wherein said module for assigning said one or more learning activities as independent work to one or more learners is only accessible by the mentor and allows the mentor to sort, search, or filter learning activities by one or more of: area of skill, interest, or expertise, educational objective, name, length, or difficulty to assign learning activities appropriate for the one or more learners; and
      iv. a software module for displaying and providing access to learning activities assigned as independent work, wherein said module for displaying and providing access to learning activities assigned as independent work is accessible by the mentor or a learner.

2. The e-learning platform of claim 1, wherein said plurality of learning activities includes one or more activities selected from: art, articles, books, brainstorms, collaborations, compositions, demonstrations, e-books, essays, examinations, games, group activities, journals, laboratory experiments, lectures, multi-player games, music, problem sets, puzzles, quizzes, reading assignments, role-plays, simulations, songs, videos, and worksheets.

3. The e-learning platform of claim 1, wherein said software module for assigning one or more learning activities as independent work allows assignment to one learner, to a plurality of learners, or to a defined group of learners.

4. The e-learning platform of claim 3, wherein said defined group of learners is a class of learners.

5. The e-learning platform of claim 1, wherein said software module for assigning one or more learning activities as independent work allows preview of independent activities to learners.

6. The e-learning platform of claim 1, wherein said software module for assigning one or more learning activities as independent work allows assignment of any activity in said plurality of activities.

7. The e-learning platform of claim 1, wherein said software module for assigning one or more learning activities as independent work allows assignment of only those activities so identified by said instructional plan.

8. The e-learning platform of claim 1, wherein said independent learning activities are homework.

9. The e-learning platform of claim 1, wherein said software module for assigning one or more learning activities as independent work allows configuration of the amount of time each activity is available to said module for displaying and providing access to independent learning activities.

10. The e-learning platform of claim 1, wherein said software module for assigning one or more learning activities as independent work allows configuration of due dates and overdue dates for each activity to be indicated by said module for displaying and providing access to independent learning activities.

11. The e-learning platform of claim 1, wherein said software module for displaying and providing access to independent learning activities comprises one or more of: a mobile application, a standalone application, or a web browser plug-in, add-in, add-on, toolbar, or extension.

12. The e-learning platform of claim 1, wherein said software module for displaying and providing access to independent learning activities generates an electronic communication for one or more learners, wherein said communication is selected from: email, web mail, SMS, MMS, microblog post, social network post, instant message, or voice mail.

13. The e-learning platform of claim 1, wherein said software module for displaying and providing access to independent learning activities allows sorting, organizing, or filtering activities by one or more of: assigning mentor, assignment date, due date, subject, and type of activity.

14. The e-learning platform of claim 1, further comprising a software module for monitoring learner progress, wherein said module is only accessible by a mentor.

15. The e-learning platform of claim 14, wherein said software module for monitoring learner progress identifies learning activities assigned as independent work and allows monitoring of independent activities separately from other activities.

16. The e-learning platform of claim 14, wherein said software module for monitoring learner progress generates a printable report.

17. Computer readable media encoded with a computer program including instructions executable by the operating system of a digital processing device, wherein said instructions create a lesson delivery server, wherein said server comprises:
   (a) a plurality of learning activities, wherein said activities are organized according to an instructional plan designed to accomplish one or more educational objectives in at least one area of skill, interest, or expertise, wherein said plan identifies one or more learning activities for use in a guided environment and identifies one or more learning activities for assignment as independent work;

(b) a software module for displaying and providing access to said one or more learning activities in a guided environment, wherein said module for displaying and providing access to said one or more learning activities in a guided environment is adapted to support a mentor's implementation of said instructional plan;

(c) a software module for assigning said one or more learning activities as independent work to one or more learners, wherein said module for assigning said one or more learning activities as independent work to one or more learners is only accessible by the mentor and allows the mentor to sort, search, or filter learning activities by one or more of: area of skill, interest, or expertise, educational objective, name, length, or difficulty to assign learning activities appropriate for the one or more learners; and (d) a software module for displaying and providing access to learning activities assigned as independent work, wherein said module for displaying and providing access to learning activities assigned as independent work is accessible by the mentor or a learner.

18. The lesson delivery server of claim 17, further comprising a software module for monitoring learner progress, wherein said module is only accessible from a mentor account.

19. A computer-implemented method for delivering e-learning lessons, comprising: providing executable instructions to a digital processing device comprising an operating system configured to perform executable instructions, to create a lesson delivery server, wherein said server comprises:

(a) a plurality of learning activities, wherein said activities are organized according to an instructional plan designed to accomplish one or more educational objectives in at least one area of skill, interest, or expertise, wherein said plan identifies one or more learning activities for use in a guided environment and identifies one or more learning activities for assignment as independent work;

(b) a software module for displaying and providing access to said one or more learning activities in a guided environment, wherein said module for displaying and providing access to said one or more learning activities in a guided environment is adapted to support a mentor's implementation of said instructional plan;

(c) a software module for assigning said one or more learning activities as independent work to one or more learners, wherein said module for assigning said one or more learning activities as independent work to one or more learners is only accessible by the mentor and allows the mentor to sort, search, or filter learning activities by one or more of: area of skill, interest, or expertise, educational objective, name, length, or difficulty to assign learning activities appropriate for the one or more learners; and (d) a software module for displaying and providing access to learning activities assigned as independent work, wherein said module for displaying and providing access to learning activities assigned as independent work is accessible by the mentor or a learner.

20. The e-learning lesson delivery method of claim 19, wherein said software modules for displaying and providing access to one or more learning activities in a guided environment and assigning one or more learning activities as independent work are part of a school-based system adapted for one or more teachers and said software module for displaying and providing access to learning activities assigned as independent work is part of a home-based system adapted for one or more students.

* * * * *